USO05841812A

United States Patent [19]
Shepherd et al.

[11] Patent Number: 5,841,812
[45] Date of Patent: Nov. 24, 1998

[54] NMOS PASS TRANSISTOR DIGITAL SIGNAL PROCESSOR FOR A PRML SYSTEM

[75] Inventors: Paul Shepherd, Abingdon, England; John Blake, Limerick, Ireland

[73] Assignee: Analog Devices, Inc., Norwood, Mass.

[21] Appl. No.: 524,082

[22] Filed: Sep. 6, 1995

[51] Int. Cl.$^6$ .................................................. H04L 27/06
[52] U.S. Cl. ........................................ 375/341; 375/345
[58] Field of Search .............................. 371/43; 375/262, 375/263, 341, 345, 350; 364/754, 757, 758, 759, 768, 784, 789

[56] References Cited

U.S. PATENT DOCUMENTS

| | | | |
|---|---|---|---|
| 4,606,027 | 8/1986 | Otami | 371/43 |
| 4,890,299 | 12/1989 | Dolivo et al. | |
| 4,893,316 | 1/1990 | Jarc et al. | 375/271 |
| 4,987,383 | 1/1991 | Mauthe | 330/279 |
| 5,099,501 | 3/1992 | Surkoezi | 375/119 |
| 5,311,178 | 5/1994 | Pan et al. | |
| 5,341,249 | 8/1994 | Abbott et al. | 360/46 |
| 5,422,601 | 6/1995 | Kovacs et al. | |
| 5,506,800 | 4/1996 | Dao-Trong | 364/738 |

OTHER PUBLICATIONS

Cideciyan et al., "A PRML System for Digital Magnetic Recording" *IEEE Journal on Selected Areas in Communication*, vol. 10, No. 1, Jan. 1992, pp. 38–56.

Knudson et al., "Dynamic Threshold Implementation of the Maximum–Likelihood Detector for the EPR4 Channel", *Globecom '91*, pp. 2135–2139.

M.J. Ferguson, "Optimal Reception for Binary Partial Response Channels", *The Bell System Technical Journal*, vol. 51, No. 2, Feb., 1972, pp. 493–505.

Richetta, et al., "A 16MB/s PRML Read/Write Data Channel", *1995 IEEE International Solid State Circuit Conference, Digest of Technical Papers*, pp. 78–79.

Siegel et al., "Modulation and Coding for Information Storage", *IEEE Communication Magazine*, Dec. 1991, pp. 68–86.

Yano et al., "A 3.8–ns CMOS 16×16–b Multiplier Using Complementary Pass–Transistor Logic", *IEEE Journal of Solid–State Circuits*, vol. 25, No. 2, Apr. 1990, pp. 388–395.

Yano et al, "A 30n–ns CMOS 16×16–6 Multiplier Using Complementary Pass–Transistor Logic," IEEE Journal of Solid State Circuits, vol. 25, No. 2 Apr. 1990, pp. 388–395.

*Primary Examiner*—Don N. Vo
*Attorney, Agent, or Firm*—Iandiorio & Teska

[57] ABSTRACT

A digital signal processor for a PRML system includes: an NMOS pass transistors gain control circuit responsive to a digital data signal for adjusting the gain of the digital data signal; an NMOS pass transistor phase control circuit responsive to the digital data signal for adjusting the phase of the data signal; and an NMOS pass transistor Viterbi maximum likelihood detector circuit for determining the most probable sequence of symbols in the data signal.

6 Claims, 18 Drawing Sheets

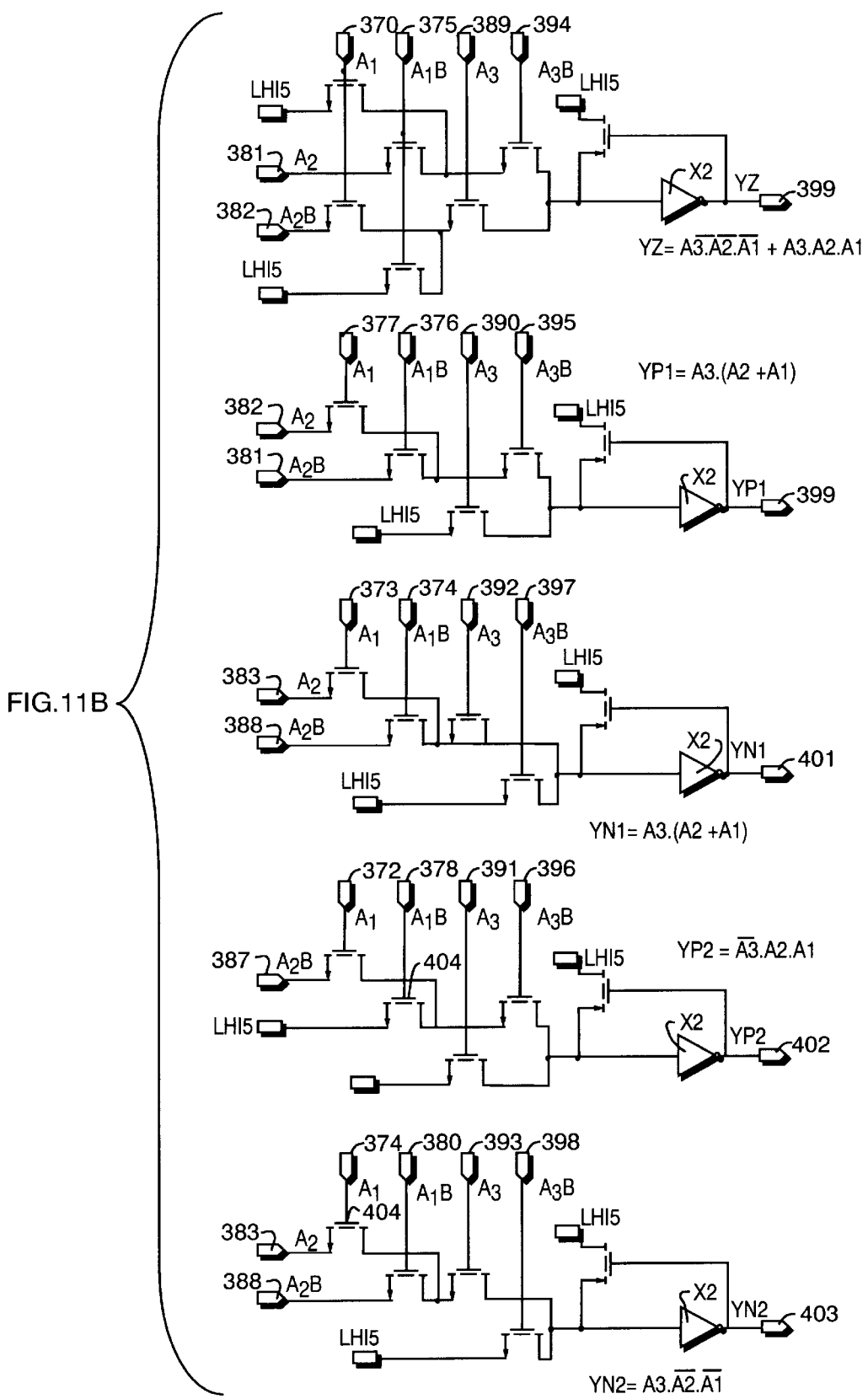

NMOS PASS TRANSISTOR DIGITAL SIGNAL PROCESSOR FOR A PRML SYSTEM

FIELD OF INVENTION

This invention relates to a digital signal processor for a PRML system and more particularly to such a processor which utilizes NMOS pass transistor logic circuitry.

BACKGROUND OF INVENTION

Partial response maximum likelihood (PRML) read channels, such as PR4 (Class-4 Partial Response) channels and EPR4 (Extended Class-4 Partial Response) channels, are used to decode information encoded on, for example, a magnetic storage disk. The data recovered from the disk is shaped to the desired PRML signal (e.g. PR4, EPR4) via a pre-amplifier, a filter, an analog to digital converter and the PRML data signals are provided to a digital signal processor which includes an adaptive filter that delivers an equalized signal to a Viterbi detector. The output of the Viterbi detector and the digital signal processor is decoded using an 8/9 decoder. The digital signal processor also includes a phase control or timing recovery circuit for adjusting the phase of the PRML data signal and a gain control or recovery circuit for adjusting the gain of the PRML data signal.

The components within the digital signal processor perform various mathematical computations and a large amount of data manipulation; accordingly these components require very complex circuitry. These digital signal processor components are typically designed using Complementary Metal Oxide Semi-conductor Logic (CMOS). Due to the complexity of the circuitry of these components and the CMOS logic used to implement these circuits, the digital signal processor requires a large integrated circuit (IC) silicon area and consumes a significant amount of power. Moreover, in order to increase the operating frequency of these components, additional CMOS circuitry must be utilized which occupies even more valuable IC silicon area.

SUMMARY OF INVENTION

It is therefore an object of this invention to provide a digital signal processor for a PRML system which occupies less IC silicon area than conventional PRML digital signal processors.

It is a further object of this invention to provide such a digital signal processor which is capable of operating at a frequency up to 30% higher than conventional PRML digital signal processors occupying the same IC silicon area.

It is a further object of this invention to provide such a digital signal processor which consumes less power than conventional PRML digital signal processors.

It is a further object of this invention to provide such a digital signal processor which utilizes NMOS (N-Channel Metal Oxide Semiconductor) pass transistor logic.

This invention results from the realization that a smaller, more power efficient and faster operating digital signal processor for a PRML read channel can be achieved by implementing one or more of the components of the digital signal processor in NMOS pass transistor logic.

This invention features a digital signal processor for a PRML system which includes an NMOS pass transistor gain control circuit responsive to a digital data signal for adjusting the gain of the digital data signal and an NMOS pass transistor phase control circuit responsive to the digital data signal for adjusting the phase of the data signal. There is an NMOS pass transistor Viterbi maximum likelihood detector circuit for determining the most probable sequence of symbols in the data signal.

In a preferred embodiment there may further be included an NMOS pass transistor adaptive filter circuit responsive to the data signal for shaping that data signal and providing a shaped data signal to the gain and phase control circuits. The circuits may each include NMOS pass transistor arithmetic components. The arithmetic components may include adders. The adders may include a parallel carry look-ahead carry-select adder. The arithmetic components may include multipliers. The multipliers may include a Booth encoder, a Wallace tree full adder array, an intermediate delay register, a Wallace tree half adder array, a parallel adder and an output delay register. The arithmetic components may include delay registers. The NMOS pass transistor Viterbi detector may include a plurality of critical paths which each include an input register, an output register, a three input adder and a multiplexer responsive to an input signal from the input register and two other input signals for forwarding one of the three input signals to the three input adders to be combined with two other intermediate signals to produce an output signal to the output register.

This invention also features a digital data signal processor for a PRML system which includes a Viterbi maximum likelihood detector circuit for determining the most probable sequence of symbols in a digital data signal, wherein the logical functions of the Viterbi detector are implemented substantially using NMOS pass transistor logic.

In a preferred embodiment the Viterbi detector may include NMOS pass transistor arithmetic components. The arithmetic components may include adders and the adders may include a parallel carry look-ahead, carry-select adder. The arithmetic components may include delay registers. The NMOS pass transistor Viterbi detector may include a plurality of critical paths which each include an input register, an output register, a three input adder and a multiplexer responsive to an input signal from the input register and to two other input signals for forwarding one of the three input signals to the three input adder to be combined with two other intermediate signals to produce an output signal to the output register.

This invention further features a digital signal processor for a PRML system which includes a gain control circuit responsive to a digital data signal for adjusting the gain of the digital data signal, wherein the logical functions of the gain control circuit are implemented substantially using NMOS pass transistor logic.

In a preferred embodiment the gain control circuit may include NMOS pass transistor arithmetic components and arithmetic components may include adders. The adders may include a parallel carry look-ahead, carry-select adder. The arithmetic components may include delay registers and the arithmetic components nay include multipliers. The multipliers may each include a Booth encoder; a Wallace tree full adder array; an intermediate delay register; a Wallace tree half adder array; a parallel adder; and an output delay register.

This invention additionally features a digital data signal processor for a PRML system which includes a phase control circuit responsive to a digital data signal for adjusting the phase of the data signal, wherein the logical functions of the phase control circuit are implemented substantially using NMOS pass transistor logic.

In a preferred embodiment the phase control circuit may include NMOS pass transistor arithmetic components and the arithmetic components may include adders. The adders may include a parallel carry look-ahead, carry-select adder. The arithmetic components may include delay registers and the arithmetic components may include multipliers. The multipliers may each include a Booth encoder; a Wallace tree full adder array; an intermediate delay register; a Wallace tree half adder array; a parallel adder; and an output delay register.

This invention also features a digital data signal processor for a PRML system which includes an adaptive filter circuit responsive to a digital data signal for shaping the data signal into a PRML data signal. The logical functions of the adaptive filter circuit are implemented substantially using NMOS pass transistor logic.

In a preferred embodiment the adaptive filter circuit may include NMOS pass transistor arithmetic components and the arithmetic components may include adders. The adders may include a parallel carry look-ahead, carry-select adder. The arithmetic components may include delay registers and the arithmetic components may include multipliers. The multipliers may each include a Booth encoder; a Wallace tree full adder array; an intermediate delay register; a Wallace tree half adder array; a parallel adder; and an output delay register.

DISCLOSURE OF PREFERRED EMBODIMENT

Other objects, features and advantages will occur to those skilled in the art from the following description of a preferred embodiment and the accompanying drawings, in which:

FIG. 11B is a schematic diagram of the recoding logic circuits of FIG. 11A;

Figure 1:
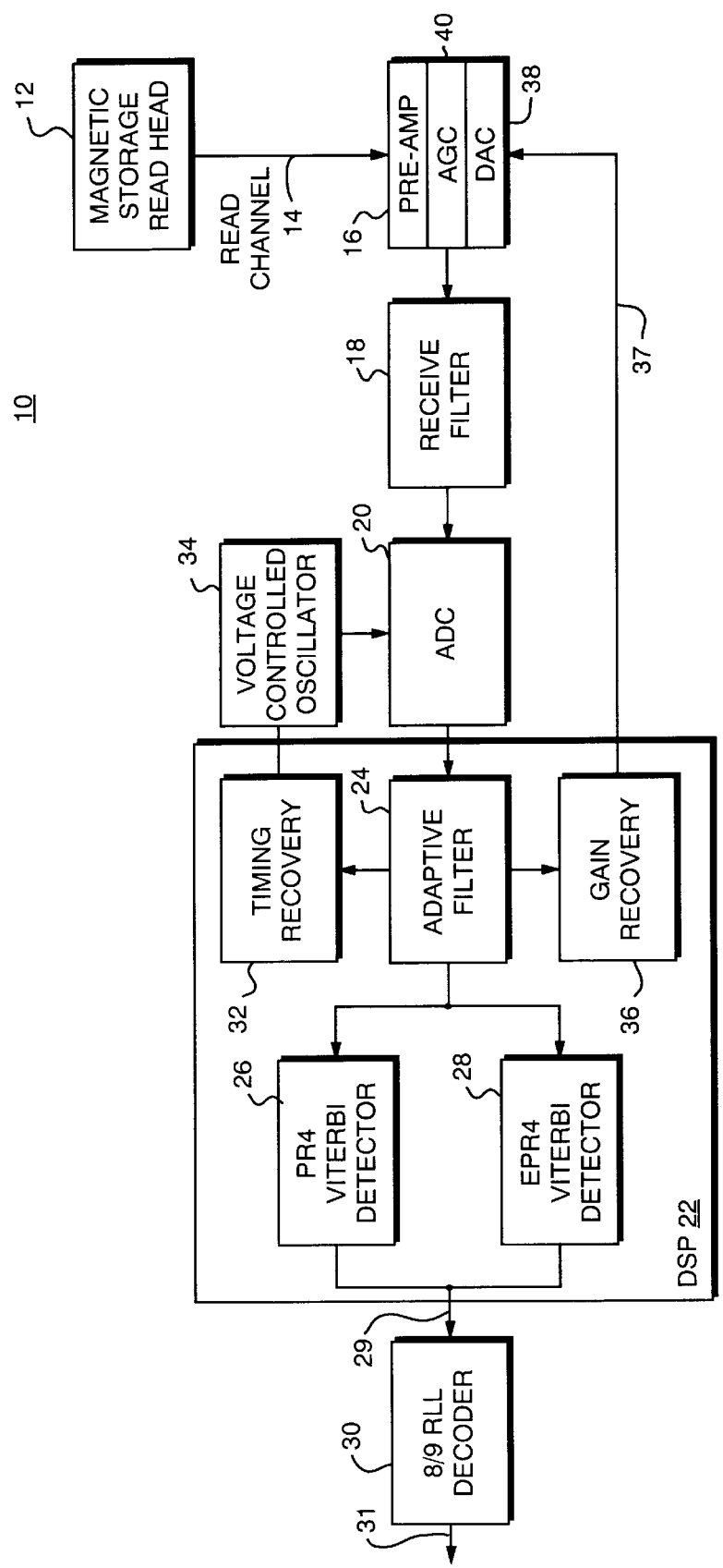
FIG. 1 is a schematic block diagram of a PRML read channel.

PRML read channel 10, FIG. 1, receives analog data signals from magnetic storage read head 12 which retrieves the analog data signals stored on a magnetic storage disk, for example. The analog data signals are delivered over read channel 14 to preamplifier circuit 16 of PRML read channel 10. Preamplifier circuit 16 amplifies the analog data signal and provides the amplified analog data signal to receive filter 18, typically a continuous time programmable filter, which performs first order shaping to the desired $(1-D^2)$ PR4 response and limits the bandwidth to half the sampling rate. The PRML shaped analog signals are provided to analog to digital converter 20, which at the system clock frequency, samples the analog PRML shaped data signals and provides the digital samples to digital signal processor 22. The digital samples are provided to adaptive filter 24, typically a digital finite impulse response (DFIR) filter, which shapes the digital waveform to conform to the order PRML signal, (e.g. either PR4 or EPR4) being detected. The signal from adaptive filter 24 is provided to either PR4 Viterbi detector 26 or EPR4 Viterbi detector 28. The Viterbi detector 26 or 28 which is being utilized outputs a processed serial binary output 29 to 8/9 RLL (Run Length Limited) decoder 30 which then outputs a decoded parallel output over line 31. Adaptive filter circuit 24 may alternatively be located outside of digital signal processor 22 before analog to digital converter 20. In this case the adaptive filter circuit would be an analog finite impulse response (AFIR) filter.

Also included within digital signal processor 22 is a timing recovery or phase control circuit 32 which adjusts the sampling phase of analog to digital converter 20 by providing an error signal to voltage controlled oscillator 34 indicative of the phase sampling error. Voltage controlled oscillator 34 then drives analog to digital converter 20 to sample appropriately the incoming PRML shaped data signals. Gain recovery or control circuit 36 within digital signal processor 22 provides a digital error signal indicative of the gain error of the digital PRML shaped waveform over line 37 to digital to analog converter 38 within preamplifier circuit 16. Digital to analog converter 38 provides an analog gain error signal to analog gain control circuit 40, also within preamplifier circuit 16, which adjusts the gain of the preamplifier so that the amplitude of the data signals match the predetermined amplitude of the PRML signal.

Figure 2:
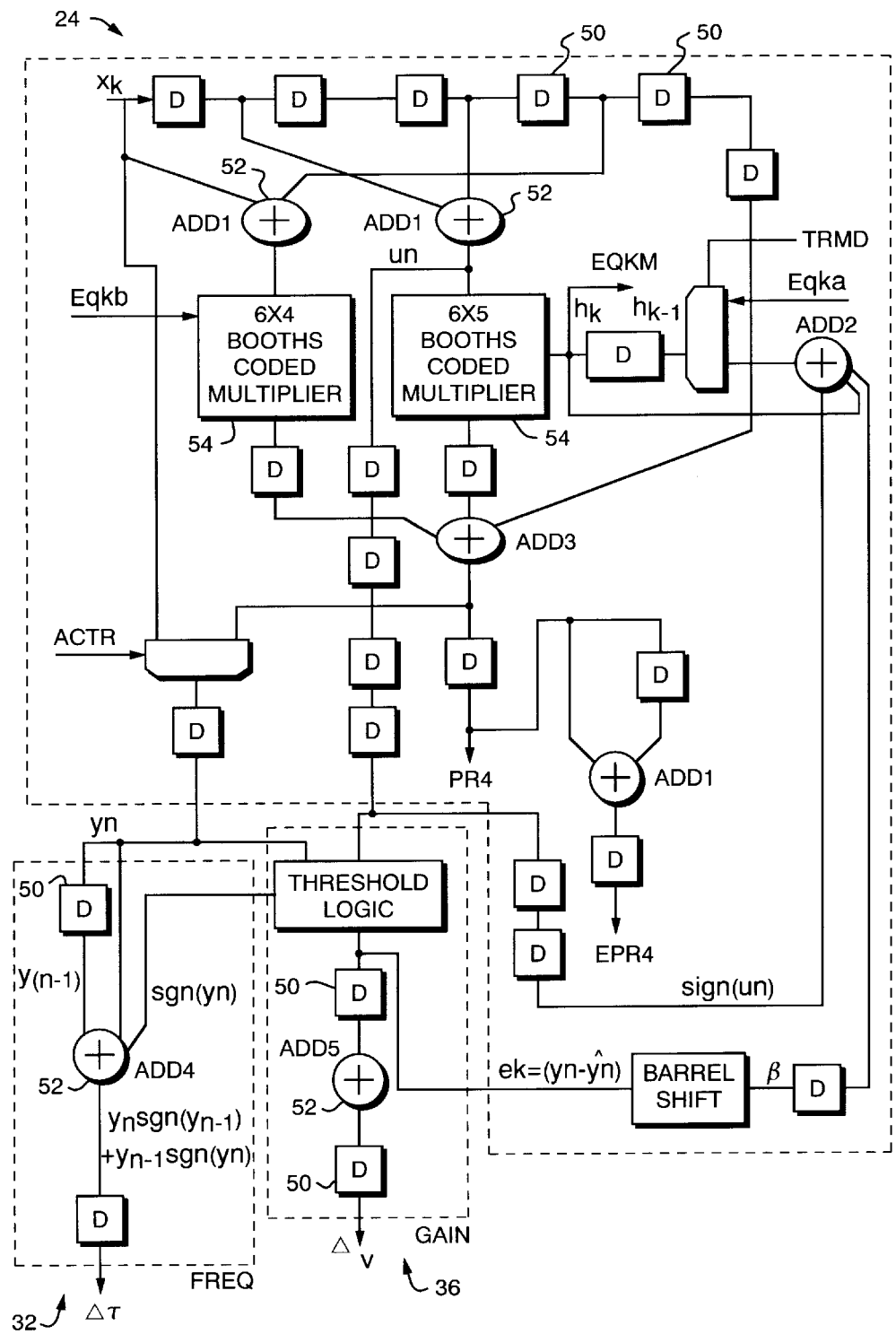
FIG. 2 is a detailed schematic block diagram of the adaptive filter, timing and gain recovery circuits of FIG. 1.

Adaptive filter 24, timing recovery or phase control circuit 32 and gain recovery or control circuit 36 are depicted in detail in FIG. 2, however, this configuration is not discussed in detail herein as its operation is understood by persons of ordinary skill in the art. See, e.g., U.S. Pat. No. 4,890,299, entitled Fast Timing Acquisition for Partial Response Signaling, issued Dec. 26, 1989 and Cideciyan et al., "A PRML System for Digital Magnetic Recording", *IEEE Journal in Selected Areas in Communications*, Vol. 10, No. 1, Jan. 1992, Pgs. 38–56, which are incorporated herein by reference in their entireties. Each of these circuits contain a number of delay registers 50 and adder circuits 52. The delay registers and adder circuits labeled with a reference number are only exemplary, as adaptive filter 24, phase control circuit 32 and gain control circuit 36 contain a greater number of these components which are not labelled with a reference number. Adaptive filter 24 also includes multiplier circuits 54. These delay registers, adders and multiplier circuits are the basic arithmetic component building blocks for performing the logical functions of the adaptive filter 24, phase control circuit 32, and gain control circuit 36. These components are relatively complex and contain a significant amount of circuitry. As described in the Background of Invention, these components and circuits are implemented typically with CMOS logic which occupy a significant amount of IC silicon area, consume a significant amount of power and, relatively speaking, are not capable of operating at a very high frequency without increasing the amount of circuitry and hence the amount of IC silicon area occupied. The instant inventors realized that by implementing one or more of the adaptive filter circuit 24, timing recovery or phase control circuit 32, gain recovery or control circuit 36, and the Viterbi detectors 26 and 28 of digital signal processor 22 in NMOS pass transistor logic, the size of the circuit components and their power consumption can be decreased. Also the circuit operating frequencies can be increased without requiring additional IC silicon area. NMOS pass transistor logic is described in detail in Yano et al., "A 3.8-ns CMOS 16×16-b Multiplier Using Complementary Pass-Transistor Logic" *IEEE Journal of Solid State Circuits*, Vol. 25, No. 2, Apr. 1990, pgs. 388–395, which is incorporated herein in its entirety by reference.

Figure 3A:
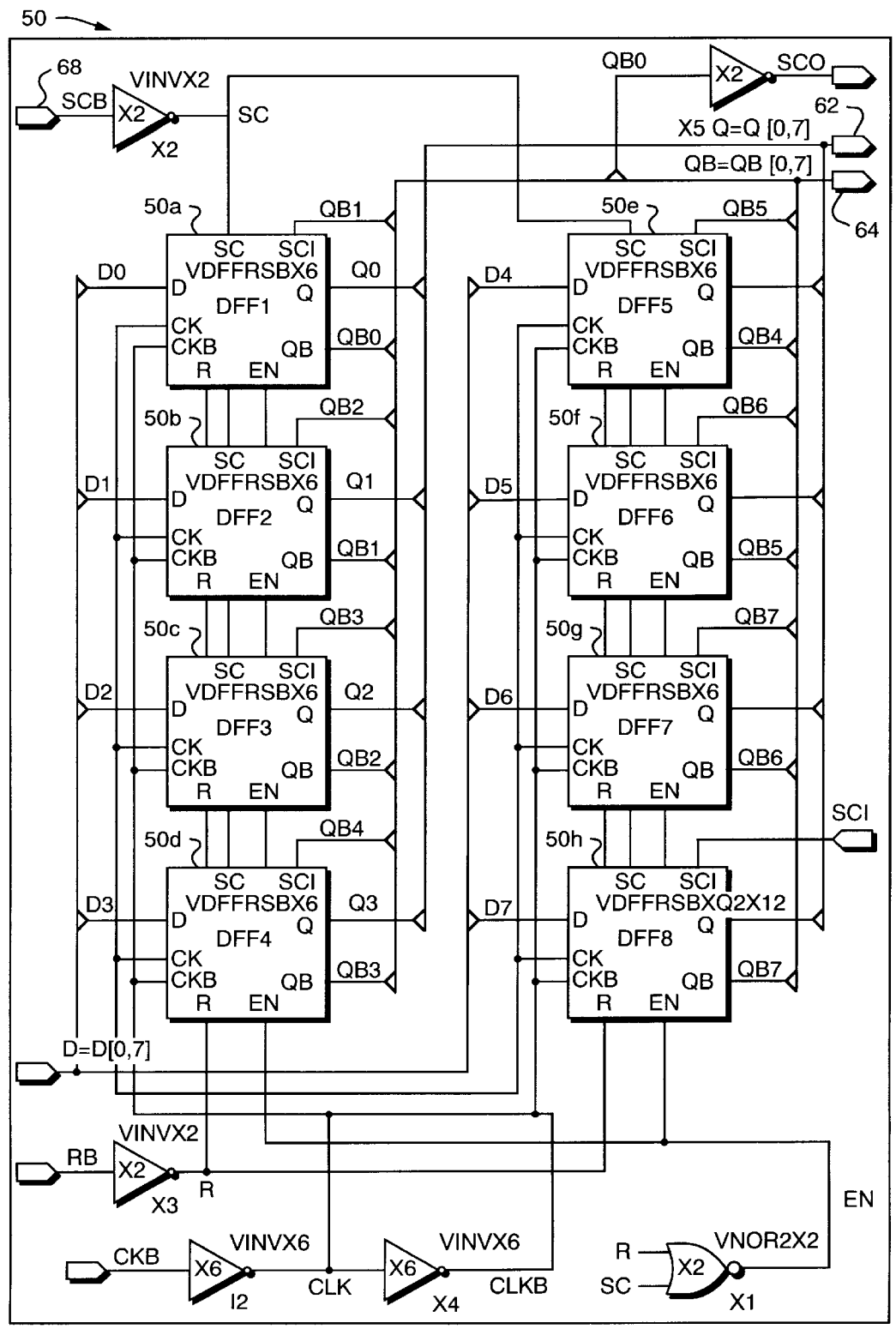
FIG. 3A is a schematic block diagram of the delay registers of FIG. 2 according to this invention.
Figure 3B:
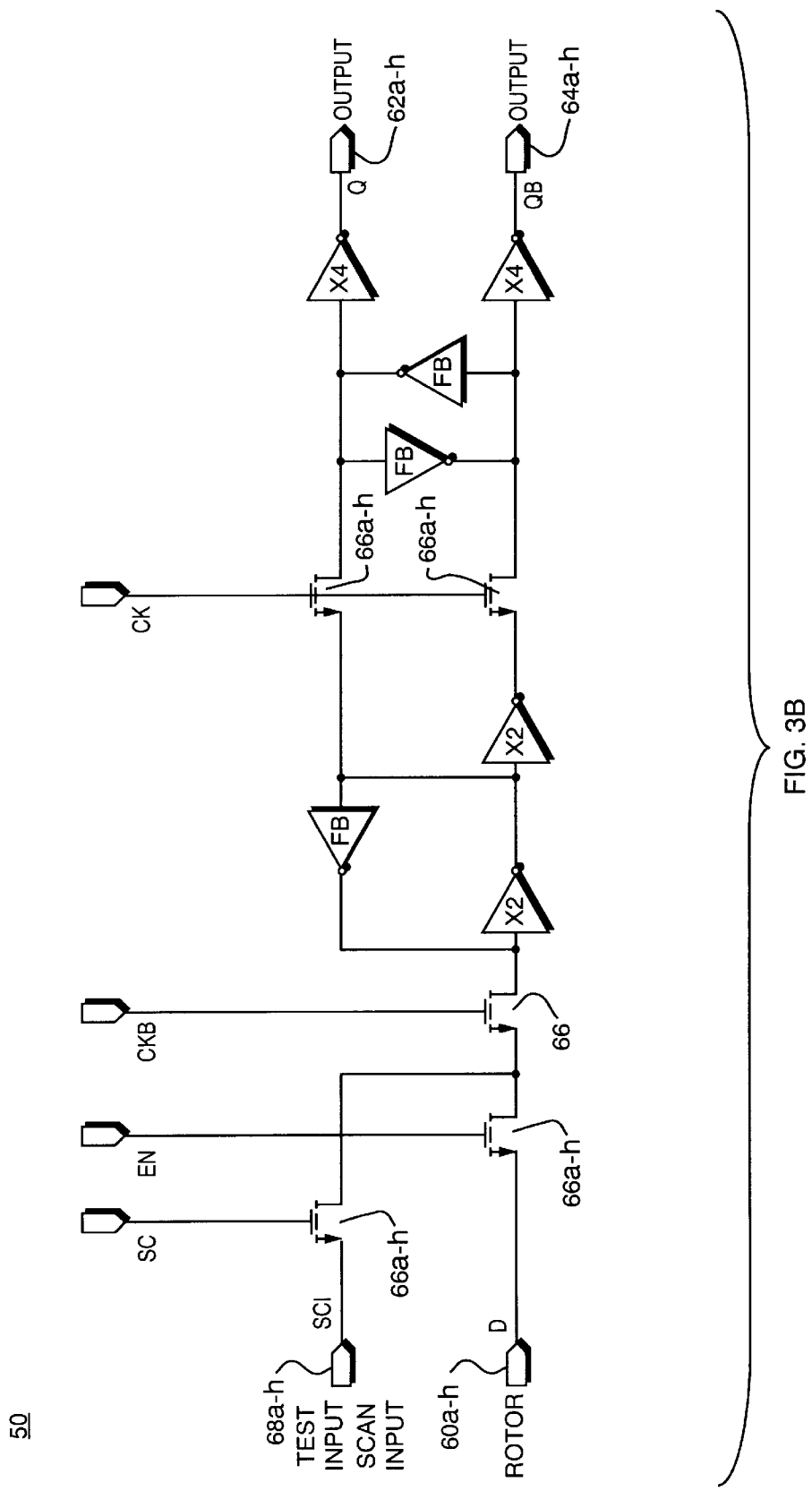
FIG. 3B is a schematic diagram of the delay circuits of the delay registers shown in FIG. 3A implemented in NMOS pass transistor logic.

The configuration of delay registers 50, FIG. 2, is shown in more detail in FIG. 3A. It should be noted that delay registers 50 in FIG. 2 are not identical to the delay register of FIG. 3A, as the delay register of FIG. 3A is a typical configuration of an eight bit delay register. For example, some of the delay registers 50, FIG. 2, are only six bit delay registers, while some are ten bit delay registers. These delay registers are, however, similarly configured to the delay register of FIG. 3A. Data is input to delay register 50 at data input terminal 60 and after one delay period is output at output terminal 62. The output at terminal 64 is the complement of the data output at terminal 62. Delay register 50 includes eight delay circuits 50*a–h*, FIG. 3B. Delay circuits 50*a–h* include a plurality of NMOS transistors 66*a–h* implemented in NMOS pass transistor logic style. Delay registers 50*a–h* also have scan or test input terminals 68*a–h*.

Figure 4:
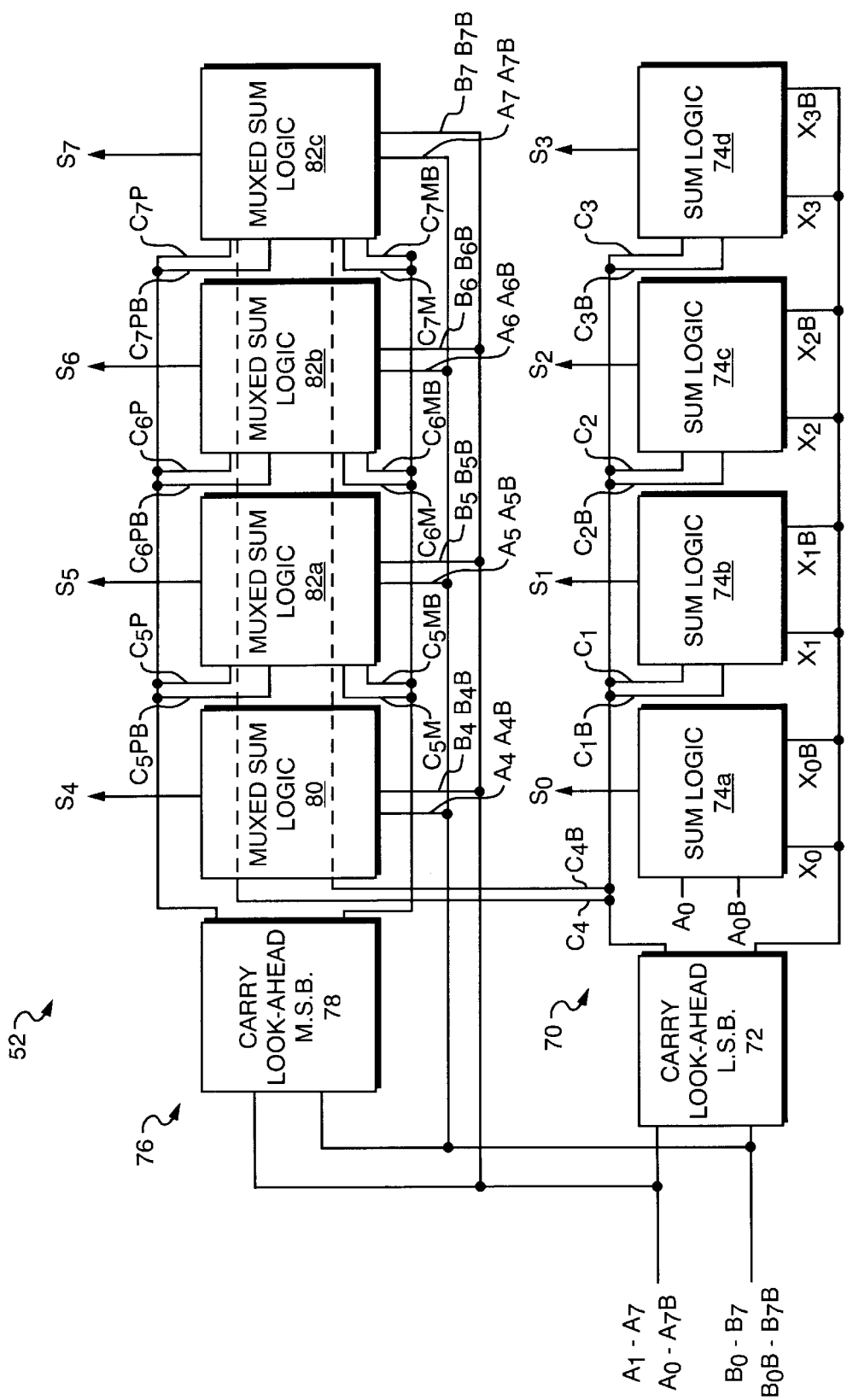
FIG. 4 is a schematic block diagram of the adder circuits of FIG. 2.

The configuration of adders 52, FIG. 2, is shown in more detail in FIG. 4. It should be noted that adders labelled 52 in FIG. 2 are not identical to the adder of FIG. 4, as the adder of FIG. 4 is a typical configuration of an 8 bit adder. For example, same of adders 52, FIG. 2, are only 6 bit adders while some are 10 bit adders. These adders are, however, similarly configured to the adder of FIG. 4. Adder 52 is a parallel carry look-ahead, carry-select adder that receives at its inputs two eight bit digital numbers $A_0$–$A_7$ and $B_0$–$B_7$ to be added, and their complements $A_0B$–$A_7B$ and $B_0B$–$B_7B$. Adder 52 includes a lower adder circuit 70 that is comprised of carry look-ahead least significant bit (LSB) circuit 72 and sum logic circuits 74*a–d* which output summed bits $S_0$–$S_3$, respectively, that are the first four bits of the sum of numbers A and B. Upper adder circuit 76 includes a carry look-ahead most significant bit (MSB) circuit 78, a multiplexed sum logic circuit 80, and three multiplexed sum logic circuits 82*a–c* which output the summed bits $S_4$–$S_7$, respectively.

Carry look-ahead LSB circuit 72 provides to the sum logic circuits 74*a–d* signals $X_0$–$X_3$ and the complements of these signals $X_0B$–$X_3B$. Sum logic circuits 74*b–74d* receive carry terms $C_1$–$C_3$ and the complement of these carry terms $C_1B$–$C_3B$. Sum logic circuit 74*a* receives in addition to the $X_0$ and $X_0B$ terms the first bit of the A term to be added, $A_0$, and its complement $A_0B$.

In upper adder circuit 76 multiplexed sum logic circuit 80 receives carry bits $C_4$ and $C_4B$ as well as bits $A_4$, $B_4$ and complements $A_4B$, $B_4B$ and outputs the summed fourth bit $S_4$. Multiplexed sum logic circuit 82*a* receives bits to be added $A_5$, $B_5$ and their complementary bits $A_5B$, $B_5B$ along with carry terms $C_5M$, $C_5P$ and complements $C_5MB$, $C_5PB$ from carry look-ahead MSB circuit 78. Multiplexed sum logic circuit 82*a* then outputs summed bit $S_5$. Multiplexed sum logic circuit 82*b* receives bits to be added $A_6$, $B_6$ and their complementary bits $A_6B$ and $B_6B$. Multiplexed sum logic circuit 82*b* also receives carry bits $C_6M$, $C_6P$ and complementary bits $C_6MB$ and $C_6PB$ and outputs summed bit $S_6$. Finally, multiplexed sum logic circuit 82*c* receives bits $A_7$, $B_7$ to be added and complementary bits $A_7B$ and $B_7B$. Also received are carry bits $C_7M$, $C_7P$ and complementary bits $C_7MB$ and $C_7PB$. Multiplexed sum logic circuit 82*c* then outputs summed bit $S_7$. Multiplexed sum logic circuits 82*a*–82*c* each also receive as an input carry and complementary carry terms $C_4$ and $C_4B$.

Figure 5:
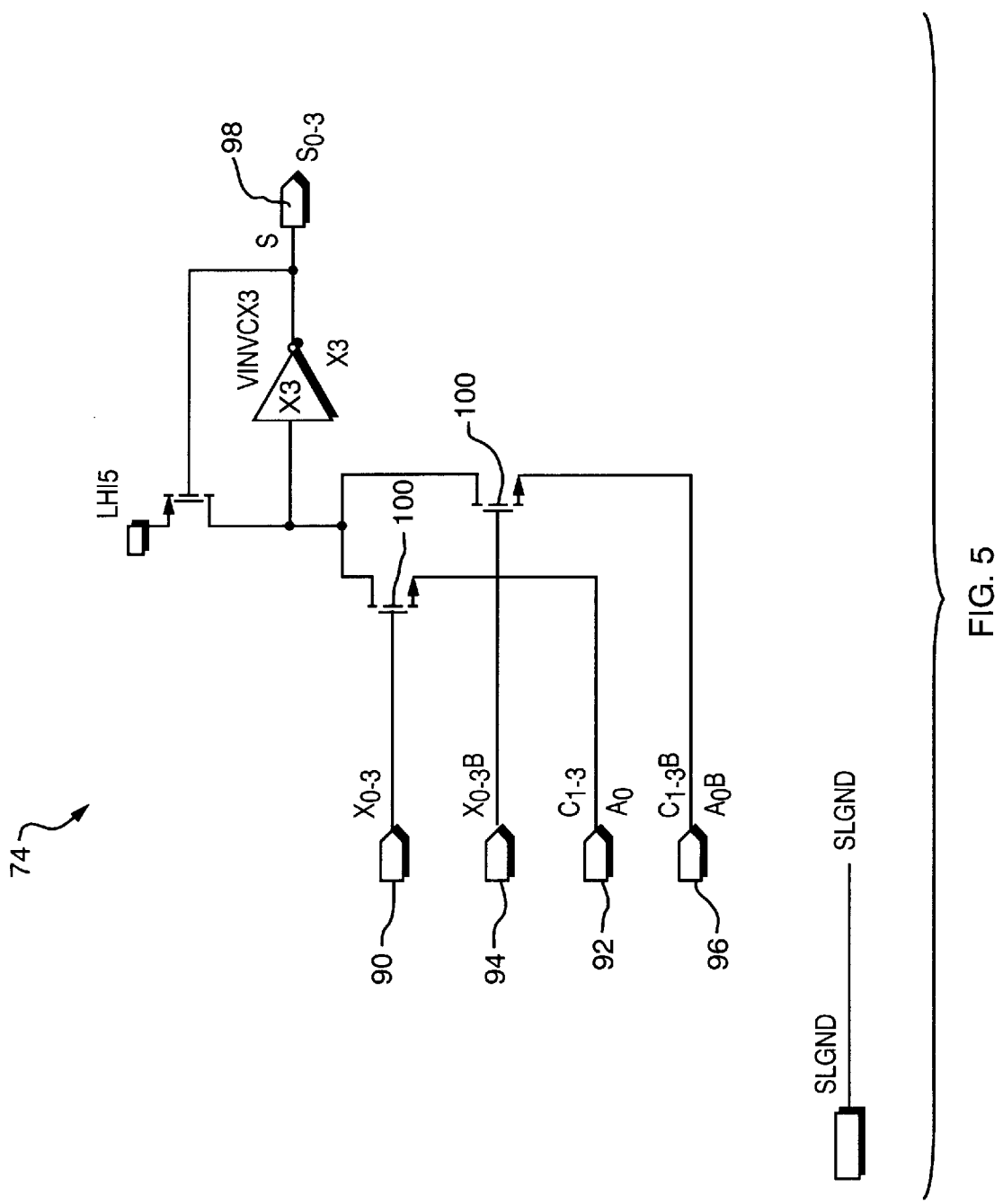
FIG. 5 is a schematic diagram of the sum logic for bits 0–3 in the circuit as shown in FIG. 4 implemented in NMOS pass transistor logic.

Sum logic circuits 74*a*–74*d*, in lower adder circuit 70, FIG. 4, are implemented in NMOS pass transistor logic as shown in FIG. 5. Sum logic circuit 74 for bits 0–3 for sum logic circuits 74*a*–74*d* includes input terminal 90 which for sum logic circuits 74*a*–74*d*, FIG. 4, receives bits $X_{0-3}$. At terminal 92 sum logic circuits 74*b*–74*d* receive carry bits $C_{1-3}$ from carry look-ahead LSB circuit 72 and sum logic 74*a* receives first bit $A_0$ at this input terminal. Input terminal 94 for sum logic circuits 74*a*–74*d* receives complementary X bits $X_{0-3}B$. Input terminal 96 for sum logic circuits 74*b*–74*d* receives complementary carry terms $C_{1-3}B$, while sum logic circuit 74*a* receives complementary bit $A_0B$. These inputs then generate at output 98 output bits $S_{0-3}$ from sum logic circuits 74*a*–74*d*, respectively. Sum logic circuit 74 includes NMOS transistors 100 implemented in NMOS pass transistor logic.

Figure 6:
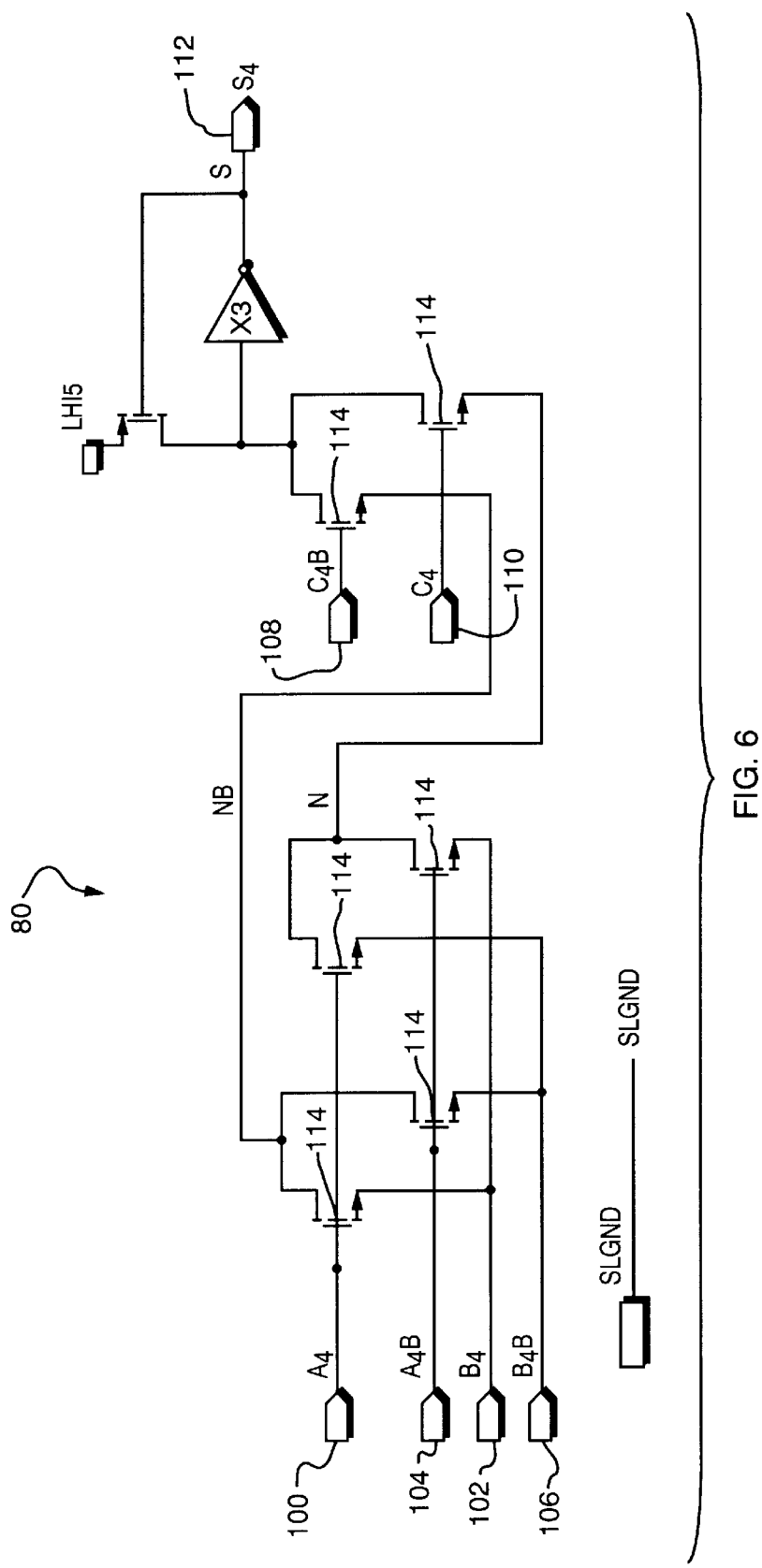
FIG. 6 is a schematic diagram of the multiplexed sum logic for bit 4 in the circuit as shown in FIG. 4 implemented in NMOS pass transistor logic.

Sum logic circuit for bit 4 of multiplexed sum logic 80 of upper adder circuit 76, FIG. 4, is shown in more detail in FIG. 6 to include inputs 100 and 102 for receiving data bits $A_4$ and $B_4$, respectively. Input terminals 104 and 106 receive the complements of these bits, namely, $A_4B$ and $B_4B$, respectively. In addition, carry bits $C_4$ and $C_4B$ from carry look-ahead LSB circuit 72, FIG. 4, are received at input terminals 108 and 110, respectively. Sum logic circuit for multiplexed sum logic circuit 80 then outputs at output terminal 112 summed bit $S_4$. Sum logic circuit for multiplexed sum logic circuit 80 also includes a plurality of NMOS transistors 114 implemented in NMOS pass transistor logic style.

Figure 7:
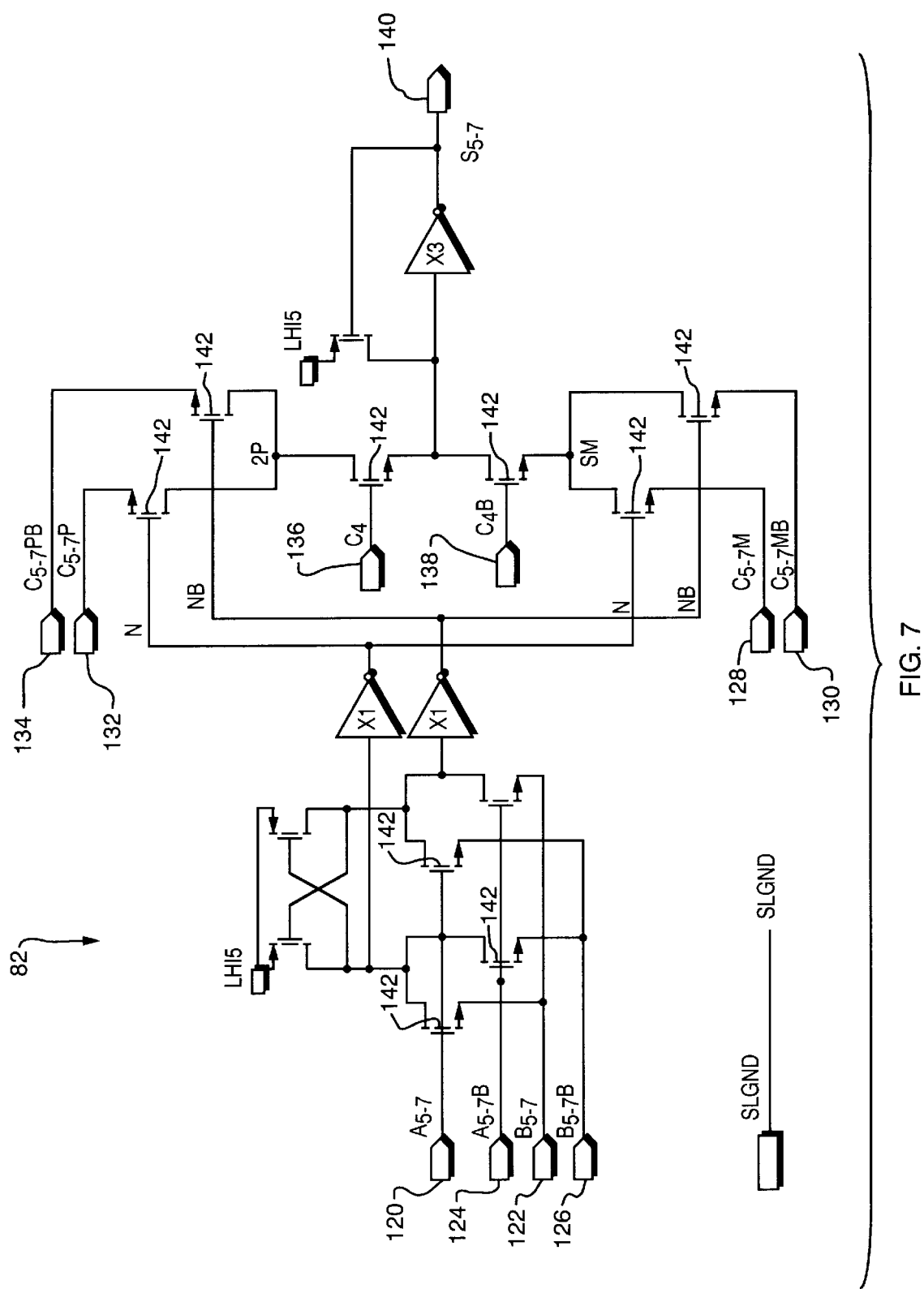
FIG. 7 is a schematic diagram of the multiplexed sum logic for bits 5–7 in the circuit as shown in FIG. 4 implemented in NMOS pass transistor logic.

Sum logic circuit 82 for multiplexed sum logic circuits 82*a*–82*c* is shown in FIG. 7 to include input terminals 120 and 122 which receive bits to be added $A_{5-7}$ and $B_{5-7}$. Input terminals 124 and 126 receive the complements of these bits $A_{5-7}B$ and $B_{5-7}B$. Carry terms $C_{5-7}M$ and complement carry terms $C_{5-7}MB$ are received at input terminals 128 and 130, respectively. Carry terms $C_{5-7}P$ and their complement terms $C_{5-7}PB$ are received at input terminals 132 and 134, respectively. Input terminals 136 and 138 receive carry bits $C_4$ and $C_4B$. The outputs from sum logic circuit 82 are summed terms $S_{5-7}$ at output terminal 140. Sum logic circuit 82 also includes a plurality of NMOS transistors 142 which are implemented in NMOS pass transistor logic.

Figure 8:
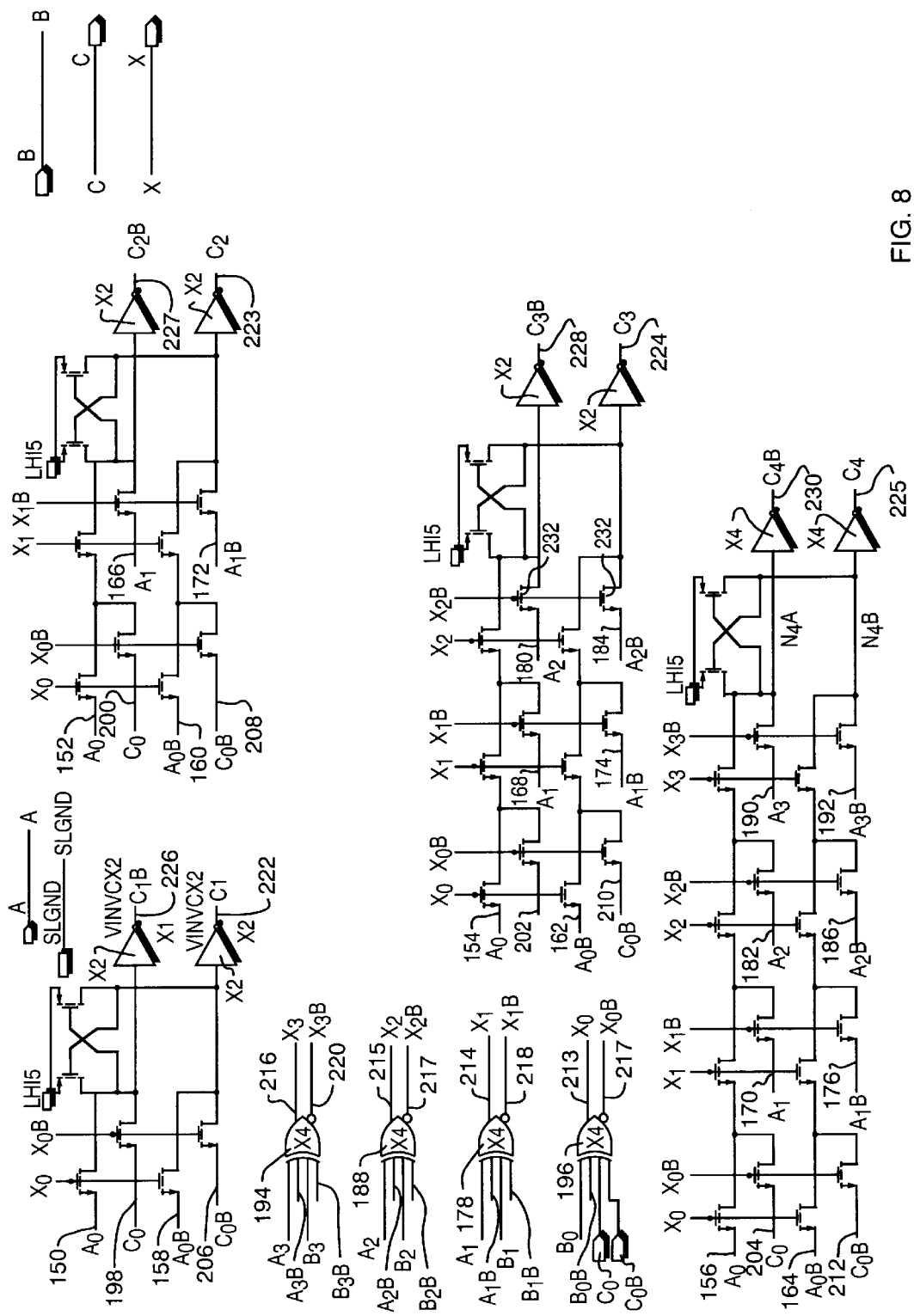
FIG. 8 is a schematic diagram of the carry look-ahead LSB circuit of FIG. 4 implemented in NMOS pass transistor logic.

Carry look-ahead LSB circuit 72 of FIG. 4 is shown in detail in FIG. 8. The first bit $A_0$ of number A is input to carry look-ahead LSB circuit 72 at input terminals 150, 152, 154 and 156 while its complement $A_0B$ is input at terminals 158, 160, 162 and 164. The next bit of number A, $A_1$, is input to circuit 72 at input terminals 166, 168 and 170 while its complement $A_1B$ is input to terminals 172, 174 and 176. Bit $A_1$ and its complement $A_1B$ are also input to exclusive OR-gate 178. Bit $A_2$ is input to circuit 72 at input terminals 180 and 182 and its complement $A_2B$ is input at input terminals 184 and 186. Bits $A_2$ and $A_2B$ are also input to exclusive OR-gate 188. Bit $A_3$ is input to circuit 72 at input terminal 190 and its complement is input to the circuit at terminal 192. Bit $A_3$ and its complement $A_3B$ are also input to circuit 72 through exclusive OR-gate 194. Also input to exclusive OR-gates 178, 188 and 194 are bits $B_1$–$B_3$ and complementary bits $B_1B$–$B_3B$, respectively. There is a fourth exclusive OR-gate 196 which receives at its input the first bit of number B to be added, $B_0$, and its complement $B_0B$. Also input to exclusive OR-gate 196 are carry terms $C_0$ and $C_0B$. Carry term $C_0$ is additionally input to circuit 72 at terminals 198, 200, 202 and 204 and its complement $C_0B$ is introduced to circuit 72 at terminals 206, 208, 210 and 212. The output signals of carry look-ahead LSB circuit 72 $X_0$–$X_3$ and $X_0B$–$X_3B$ are output at terminals 213–220. Signals $C_1$–$C_4$ are output at terminals 222–225 while their complementary outputs are at terminals 226–229. Carry look-ahead LSB circuit 72 includes a plurality of NMOS transistors, as exemplified by transistors 232, configured in NMOS pass transistor logic.

Figure 9:
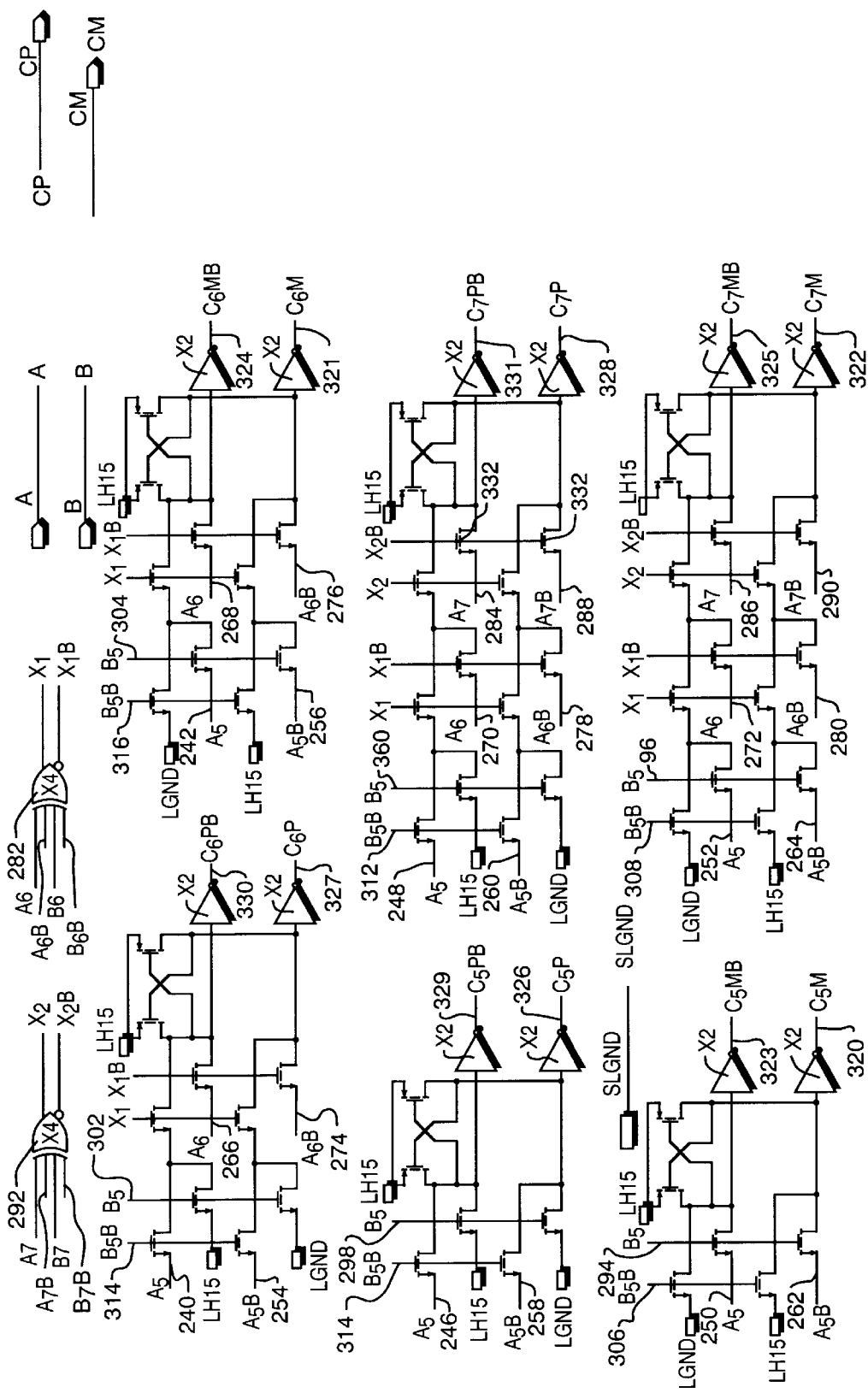
FIG. 9 is a schematic diagram of the carry look-ahead MSB circuit of FIG. 4 implemented in NMOS pass transistor logic.

Carry look-ahead MSB circuit 78 of FIG. 4 is shown in detail in FIG. 9. Bit $A_5$ is introduced to circuit 78 at input terminals 240, 242, 246, 248, 250 and 252 while its complement $A_5B$ is introduced to this circuit at terminals 254, 256, 258, 260, 262 and 264. Bit $A_6$ is provided to input terminals 266, 268, 270 and 272 while its complement $A_6B$ is introduced to terminals 274, 276, 278 and 280. In addition, bit $A_6$ and its complement $A_6B$ as well as bit $B_6$ and its complement $B_6B$ are provided to exclusive OR-gate 282. Bit $A_7$ is input to circuit 78 at input terminals 284 and 286 and its complement $A_7B$ is introduced to circuit 78 at terminals 288 and 290. Bit $A_7$ and its complement $A_7B$ as well as bit $B_7$ and its complement $B_7B$ are also provided to exclusive OR-gate 292. Bit $B_5$ is provided to circuit 78 at terminals 294, 296, 298, 300, 302 and 304 and its complement $B_5B$ to terminals 306, 308, 310, 312, 314 and 316. The outputs of circuit 78, $C_5M$–$C_7M$ and their complements $C_5MB$–$C_7MB$ are output at terminals 320–325. And, outputs $C_5P$–$C_7P$ and their complements $C_5PB$–$C_7PB$ are output at terminals 326–331. Carry look-ahead MSB circuit 78 also includes a plurality of NMOS transistors, exemplified by transistors 332, implemented in NMOS pass transistor logic style.

Figure 10:
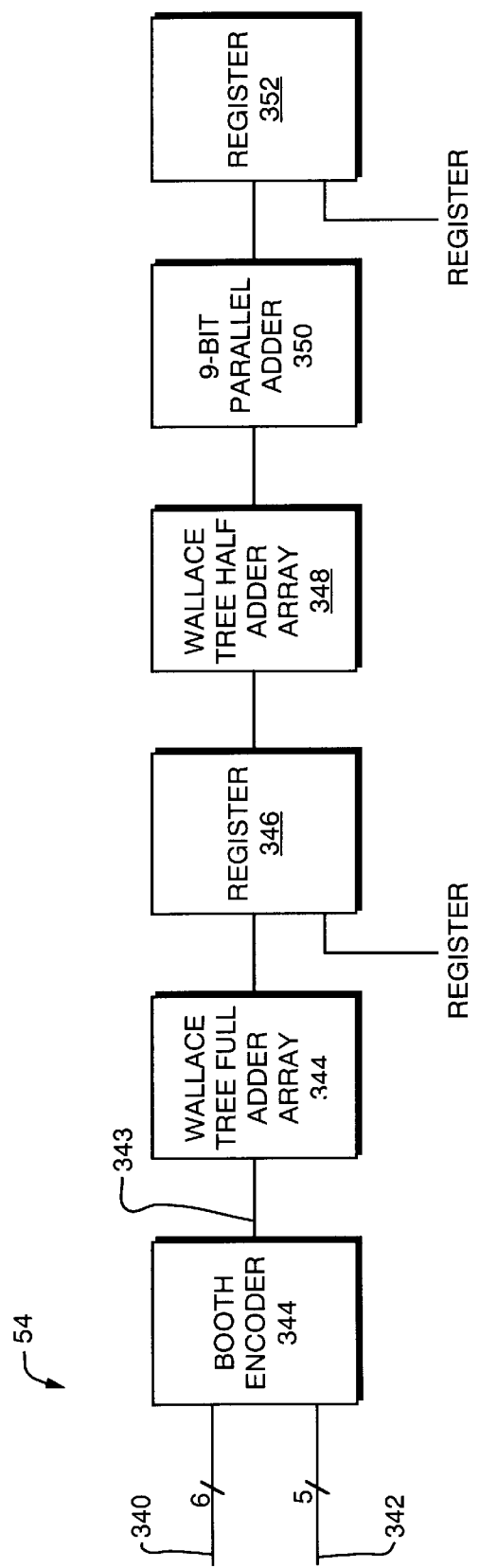
FIG. 10 is a schematic block diagram of the 6×5 multiplier of FIG. 2.
Figure 12A:
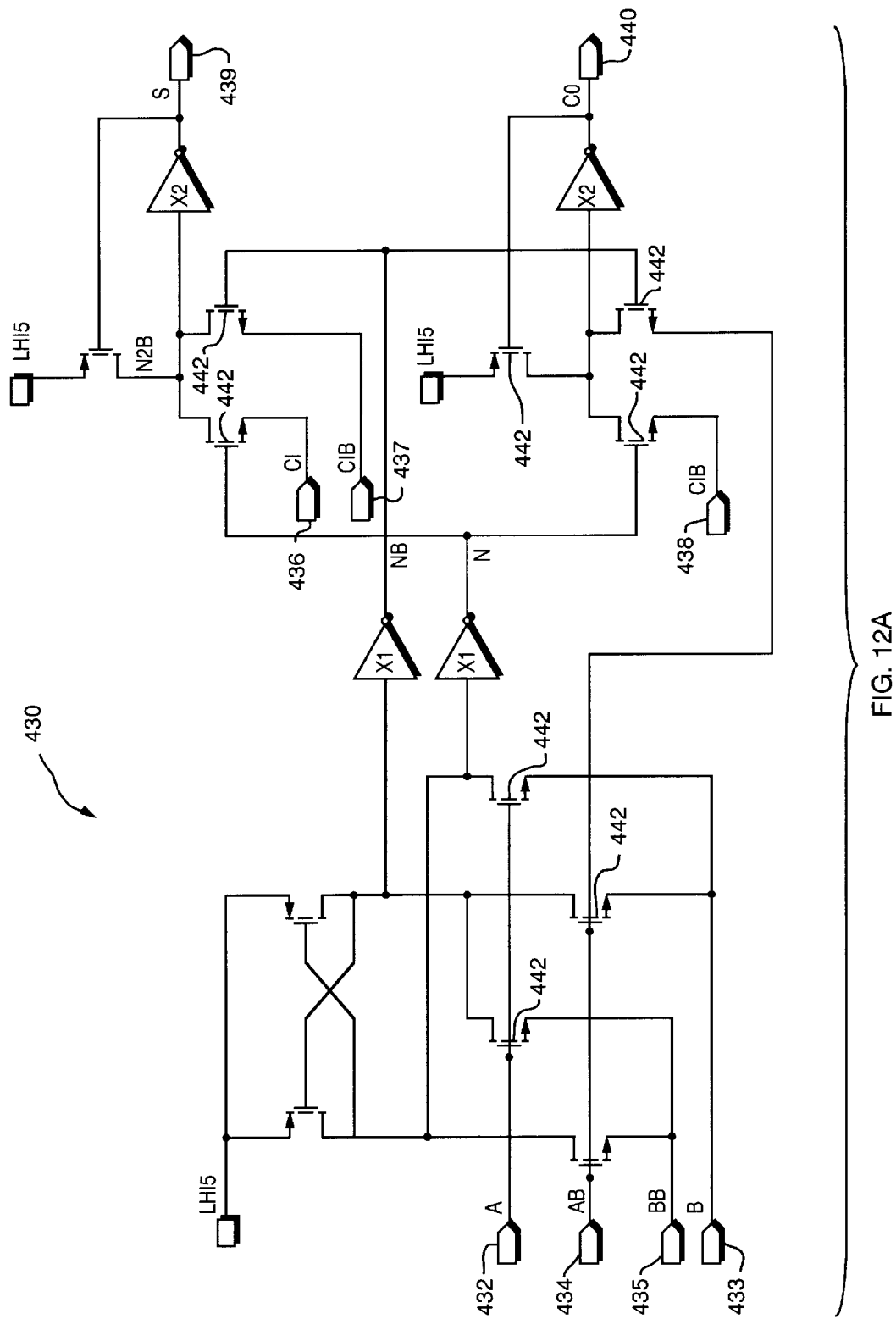
FIG. 12A is a schematic diagram of a full adder circuit used in the Wallace tree full adder array shown in FIG. 10.

Multiplier circuit 54 of FIG. 2 is shown in more detail in FIG. 10. Although multiplier 54 of FIG. 10 is shown to be a 6×5 multiplier, the 6×4 multiplier of FIG. 2 would be similarly implemented. Multiplier 54 receives at input terminals 340 and 342 a six bit digital number (A) and a five bit digital number (B), respectively. These digital numbers are provided to Booth encoder 344 which implements a coding technique for multiplying signed binary numbers. Booth encoder 344 provides an output over line 343 to Wallace tree full adder array 344 comprised of an array of full adder cells as depicted in FIG. 12A described below. The output of Wallace tree full adder array 344 is provided to delay register 346 which is configured in the manner of delay register 50 of FIG. 3A and its output is provided to Wallace tree half adder array 348 comprised of an array of half adder circuits as described below with regard to FIG. 12B. The output of Wallace tree half adder array 348 is provided to nine bit parallel adder 350 which is configured in the manner of adder 52 of FIG. 4. The output of 9 bit parallel adder 350 is provided to output delay register 352 which then outputs the product of inputs A and B. Each of the components of multiplier 54 are configured in NMOS pass transistor logic style.

Figure 11A:
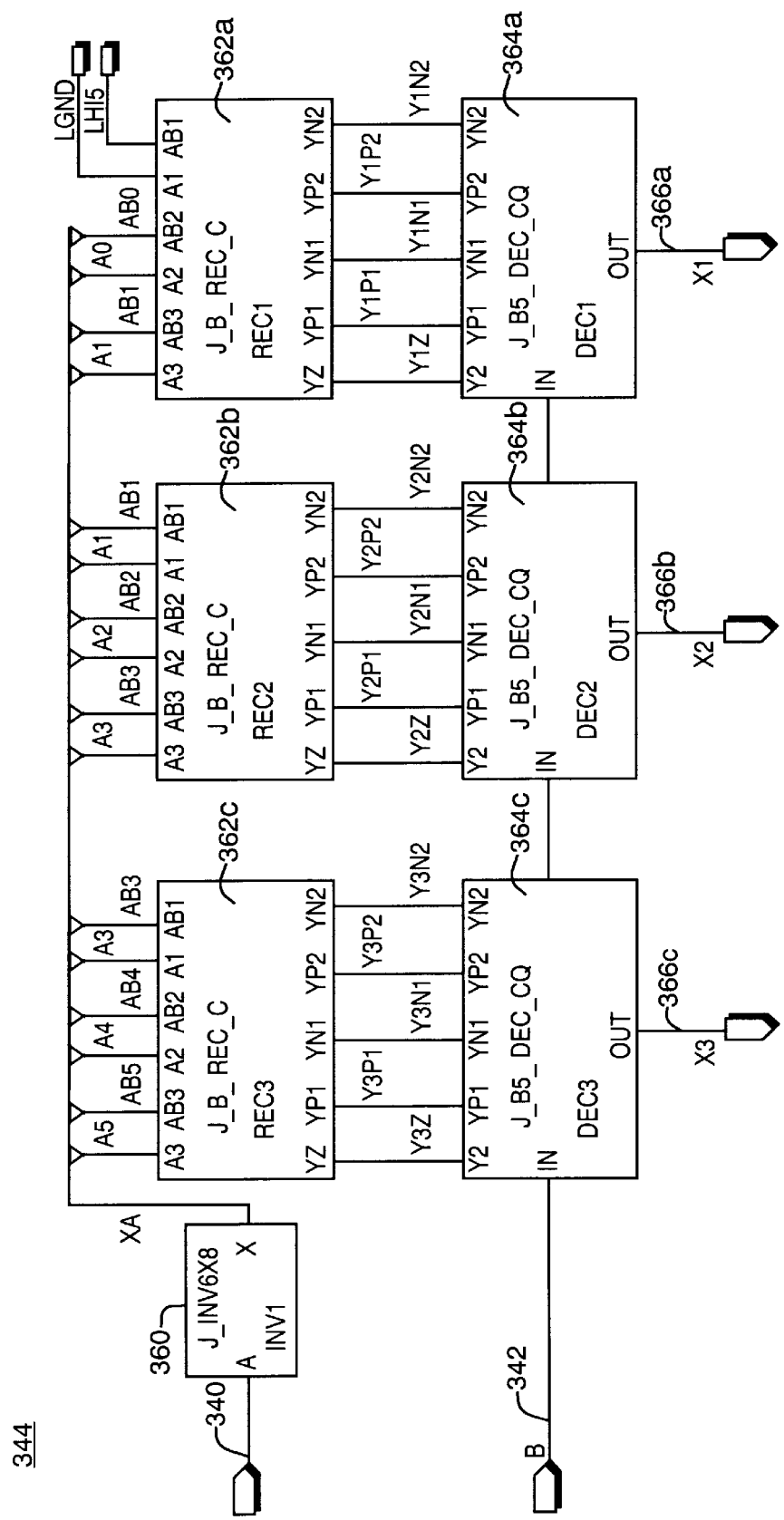
FIG. 11A is a schematic diagram of the Booth encoder of FIG. 10.

Booth encoder 344, FIG. 11A, is shown to receive at its input terminals 340 and 342 a six bit digital word (A) in a five bit digital word (B), respectively. Digital word A is provided to inverter circuit 360 which outputs digital word A and its complement AB which are provided to recoding logic circuits 362a, 362b and 362c. Digital word B is provided to decoders 364a, 364b and 364c which also receive the outputs YZ, YP1, YN1, YP2 and YN2 from recoding logic circuits 362a–c. Decoders 364a–c then provide outputs X1, X2 and X3 at output terminals 366a, 366b and 366c, respectively.

Recoding logic circuit 362b is shown in detail in FIG. 11B. Recoding logic circuits 362a and 362c are configured similarly. Logic circuit 362b receives the $A_1$ bit and its complementary bit $A_1B$ at input terminals 370–374 and 375–380. The $A_2$ bit is received at input terminals 381–384 and its complementary bit $A_2B$ is received at terminals 385–388. The $A_3$ bit is received at input terminals 389–393 and its complementary bit $A_3B$ is received at terminals 394–398. Outputs YZ, YP1, YN1, YP2 and YN2 are provided to output terminals 399–403. Circuit 362b includes a plurality of NMOS transistors 304 which are implemented in NMOS pass transistor logic.

Figure 11C:
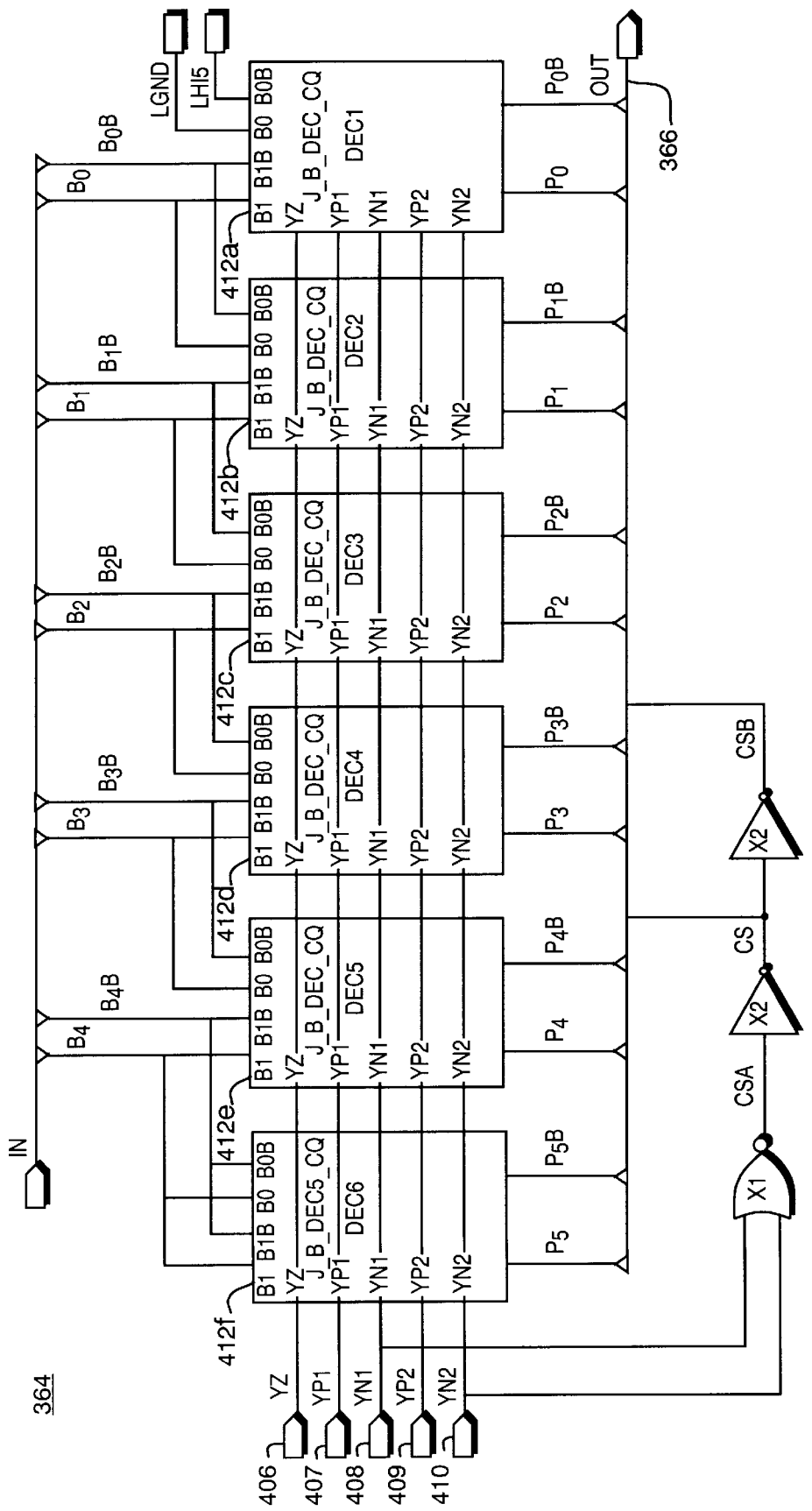
FIG. 11C is a schematic block diagram of the decoders of FIG. 11A.

Decoders 364a–c are shown in more detail as decoder circuit 364 in FIG. 11C. Decoder 364 receives at input terminals 406–410 signals YZ, YP1, YN1, YP2 and YN2 from a recoding circuit as shown in FIG. 11A. These signals are provided to decoding circuits 412a–f. Decoding circuits 412a–f also receive, respectively, as inputs bits, $B_0$–$B_4$, and complementary bits $B_0B$–$B_4B$ and provide an output at output terminal 366.

Figure 11D:
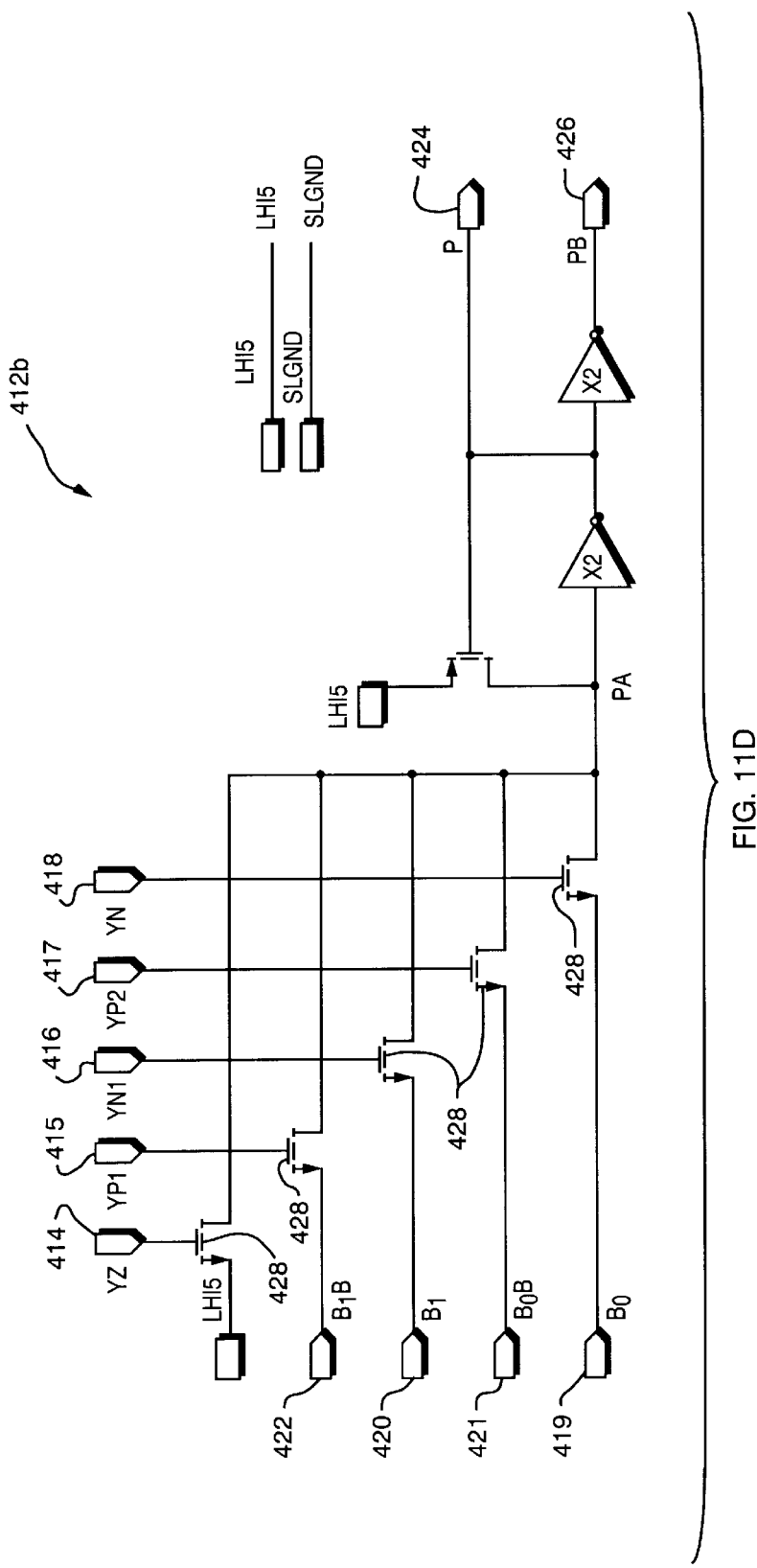
FIG. 11D is a schematic diagram of the decoder circuits of FIG. 1C.

Decoder circuit 412b is shown in more detail in FIG. 11D. The other decoder circuits are similarly configured. Decoder circuit 412b includes input terminals 414–418 which receive signals YZ, YB1, YN1, YP2 and YN. Input terminals 419 and 420 receive the first two bits, $B_0$ and $B_1$, of digital word B while input terminals 421 and 422 receive the complements of these terms, namely, $B_0B$ and $B_1B$. The output of decoder circuit 412b is provided at terminal 424 and its complement is provided at output terminal 426. This circuit is implemented with a number of NMOS transistors 428 implemented in an NMOS pass transistor logic.

Wallace tree full adder array 344, FIG. 10, includes a plurality of Wallace tree full adder circuits 430 as shown in FIG. 12A. Circuit 430 receives inputs A and B at input terminals 432 and 433 and complements, AB and BB, at terminals 434 and 435, respectively. Circuit 430 also receives a carry bit, CI, at input terminal 436 and the complement of that carry bit, CIB, at input terminals 437 and 438. The output of this circuit is provided at output terminal 439 and a carry term, $C_O$, is provided at output terminal 440. Wallace tree full adder circuit 430 includes a plurality of NMOS transistors 442 configured in NMOS pass transistor logic.

Figure 12B:
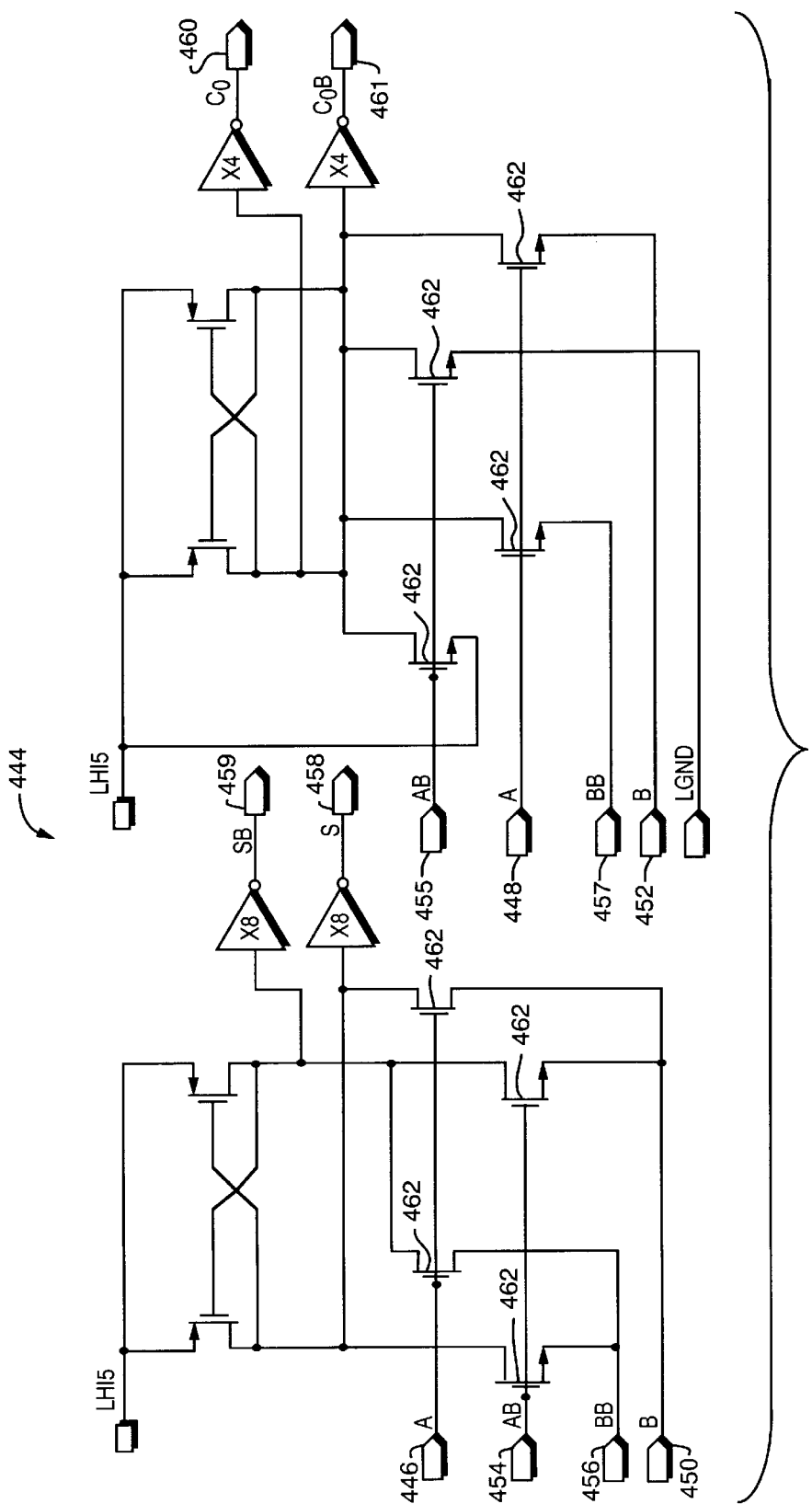
FIG. 12B is a schematic diagram of a half adder circuit used in the Wallace tree half adder array shown in FIG. 10.

Wallace tree half adder array 348, FIG. 10, includes a plurality of Wallace tree half adder circuits 444 as shown in FIG. 12B. Input terminals 446 and 448 receive input A and terminals 450 and 452 receive input B. Terminals 454 and 455 receive the complement of A, namely, AB and terminals 456 and 457 receive the complement of B, namely, BB. Output terminals 458 and 459 output the sum and the complement of the sum, respectively. Terminals 460 and 461 output carry term $C_O$ and its complement $C_OB$. Wallace tree half adder circuit 444 includes a number of NMOS transistors 462 which are implemented in NMOS pass transistor logic.

Viterbi detectors 26 and 28 are also implemented in NMOS pass transistor logic. A dynamic threshold implementation of PR4 Viterbi detector 26 is described in a paper by M. J. Ferguson, "Optimal Reception for Binary Partial Response Channels", The Bell Systems Technical Journal, Feb. 1972, pp. 493–505. PR4 Viterbi detectors are widely used and would be easily implementable by persons skilled in the art using circuits similar to adder 52 in FIG. 4 and delay register 50 in FIG. 3.

Figure 13:
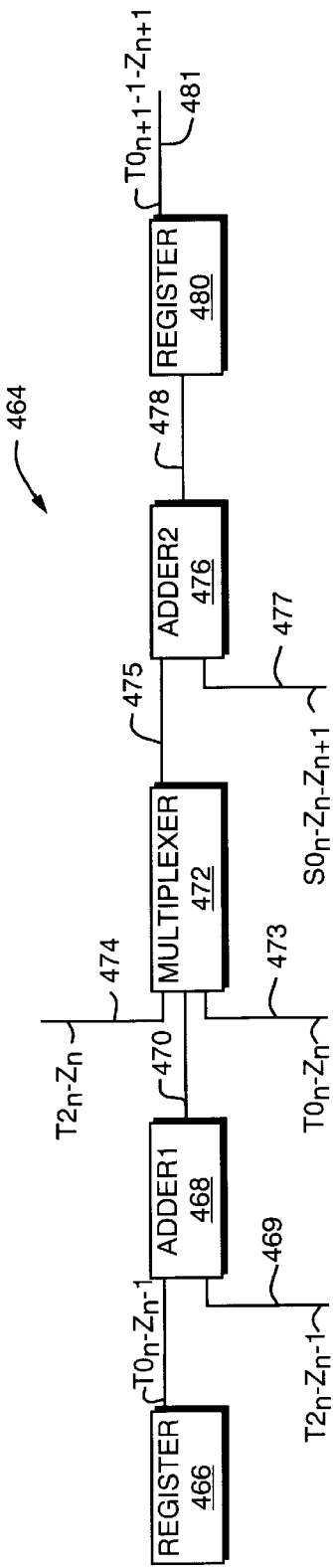
FIG. 13 is a prior art implementation of a critical path of an EPR4 Viterbi detector.

A dynamic threshold implementation for EPR4 Viterbi detector 28 is described in a paper by Knudson et al., "Dynamic Threshold Implementation of Maximum Likelihood Detector for the EPR4 Channel", *Globecom* 91, pgs. 2135–2139. Implementation of the set of equations (20)–(26) described on page 2137 of this paper results in a number of similar critical paths. One of these critical paths (464) is as a result of implementing equation (20) and is shown in FIG. 13. Critical path 464 includes register 466, which provides one input, $T0_n-Z_n-1$, to a first adder 468 and a second input, $T2_n-Z_n-1$, is delivered on line 469 to first adder 468. The output of adder 468 is provided over line 470 to multiplexer 472 which also receives over lines 473 and 474 signals $T0_n-Z_n$, and $T2_n-Z_n$, respectively. The output of multiplexer 472 is provided over line 475 to a second adder 476 which adds the output of multiplexer 472 to signal $S0_n-Z_n-Z_{n+1}$, over line 477 to second adder 476. The output of second adder 476 is provided over line 478 to output delay register 480 which, after a delay, provides the output, $T0_{n+1}-1-Z_{n+1}$, of critical path 464 over line 481. The critical paths similar to critical path 464 limit the maximum operating frequency of operation of EPR4 Viterbi detector 28.

To reduce the critical path, and hence increase the maximum frequency of operation of EPR4 Viterbi detector 28 the set of equations from Knudson's paper have been modified by the present inventors and can be implemented as follows:

$$T0_{n+1}-Z_{n+1}=S0_n-Z_n-Z_{n+1}-1-Max[T0_n-Z_n,0]+Max[T2_n-Z_n,0] \quad (1)$$

$$T0_{n+1}-Z_{n+1}+1=S0_n-Z_n-Z_{n+1}-Max[T0_n-Z_n,0]+Max[T2_n-Z_n,0] \quad (2)$$

$$T1_{n+1}-Z_{n+1}=S0_n-Z_n-Z_{n+1}+1-Max[T0_n-Z_n+1,0]+Max[T2_n-Z_n+1,0] \quad (3)$$

$$T1_{n+1}-Z_{n+1}+1=S0_n-Z_n-Z_{n+1}+2-Max[T0_n-Z_n+1,0]+Max[T2_n-Z_n+1,0] \quad (4)$$

$$T2_{n+1}-Z_{n+1}=S1_n-Z_n-Z_{n+1}-1-Max[T1_n-Z_n,0]+Max[T3_n-Z_n,0] \quad (5)$$

$$T2_{n+1}-Z_{n+1}+1=S1_n-Z_n-Z_{n+1}-Max[T1_n-Z_n,0]+Max[T3_n-Z_n,0] \quad (6)$$

$$T3_{n+1}-Z_{n+1}=S1_n-Z_n-Z_{n+1}+1-Max[T1_n-Z_n+1,0]+Max[T3_n-Z_n+1,0] \quad (7)$$

$$T3_{n+1}-Z_{n+1}+1=S1_n-Z_n-Z_{n+1}+2-Max[T1_n-Z_n+1,0]+Max[T3_n-Z_n+1,0] \quad (8)$$

$$T2_{n+1}-T0_{n+1}=SDIFF_n-Max[T1_n-Z_n,0]+Max[T3_n-Z_n,0]+Max[T0_n-Z_n,0]-Max[T2_n-Z_n,0] \quad (9)$$

$$T3_{n+1}-T1_{n+1}=SDIFF_n-Max[T1_n-Z_n+1,0]+Max[T3_n-Z_n+1,0]+Max[T0_n-Z_n+1,0]-Max[T2_n-Z_n+1,0] \quad (10)$$

$$S0_{n+1}=S2_n+T1_n-Max[T0_n-Z_n,0]-Min[T1_n-Z_n,0] \quad (11)$$

$$S1_{n+1}=S2_n+T1_n-Max[T0_n-Z_n+1,0]-Min[T1_n-Z_n+1,0] \quad (12)$$

$$S2_{n+1}+Z_{n+1}=Z_n+Z_{n+1}-1-Max[T0_n-Z_n,0]+Max[T0_n-Z_n+1,0] \quad (13)$$

$$SDIFF_{n+1}=-Max[T0_n-Z_n+1,0]-Min[T1_n-Z_n+1,0]+Max[T0_n-Z_n,0]+Min[T1_n-Z_n,0] \quad (14)$$

Figure 14:
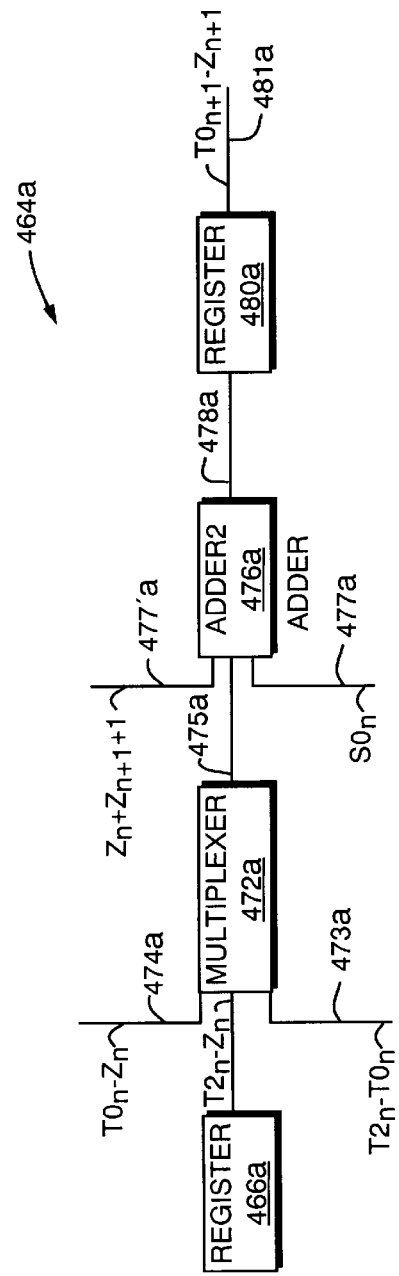
FIG. 14 is a critical path of an EPR4 Viterbi detector according to this invention.

Implementation of this set of equations results in a new set of similar critical paths. One of these critical paths, 464a, FIG. 14, is a result of implementing equation (1). Analysis of critical path 464a shows how it is reduced relative to critical path 464. Critical path 464a includes input register 466a which provides signal $T2_n-Z_n$ directly to multiplexer 472a, thereby eliminating first adder 468, FIG. 13. Also input to multiplexer 472a over lines 473a and 474a are signals $T2_n-T0_n$ and $T0_n-Z_n$, respectively. The output of multiplexer 472a is provided over line 475a to three input adder 476a which adds the output of multiplexer 472a to signals $S0_n$ and $Z_n+Z_{n+1}+1$ input over lines 477a and 477a', respectively. The output of adder 476a is provided over line 478a to output register 480a and after a delay the output of critical path 464a, $T0_{n+1}-Z_{n+1}$, is provided over line 481a. By combining the two input adders of critical path 464, namely, first adder 468 and second adder 476 into a single three input adder 476a of critical path 464a the maximum frequency of operation of EPR4 Viterbi detector 28 is increased.

It should be noted that the nodes in the pass transistor networks of the circuits of this invention should be constructed to have as little track capacitance as possible.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A digital data signal processor for a PRML system comprising:

an NMOS pass transistor gain and control circuit responsive to a digital data signal for adjusting the gain of the digital data signal;

an NMOS pass transistor phase control circuit responsive to said digital data signal for adjusting the phase of said data signal; and an NMOS pass transistor Viterbi maximum likelihood detector circuit for determining the most probable sequence of symbols in said data signal;

wherein said circuits each include NMOS pass transistor arithmetic components which include multipliers; and in which said multipliers each include a Booth encoder; a Wallace tree full adder array; an intermediate delay register; a Wallace tree half adder array; a parallel adder; and an output delay register.

2. A digital data signal processor for a PRML system comprising:

an NMOS pass transistor gain control circuit responsive to a digital data signal for adjusting the gain of the digital data signal;

an NMOS pass transistor phase control circuit responsive to said digital data signal for adjusting the phase of said data signal; and an NMOS pass transistor Viterbi maximum likelihood detector circuit for determining the most probable sequence of symbols in said data signal;

said NMOS pass transistor Viterbi detector including a plurality of critical paths which each include an input register, an output register, a three input adder and a multiplexer responsive to an input signal from said input register and to two other input signals for forwarding one of the three input signals to said three input adders to be combined with two other intermediate signals to produce and output signal to said output register.

3. A digital data signal processor for a PRML system comprising:

a Viterbi maximum likelihood detector circuit for determining the most probable sequence of symbols in a digital data signal wherein the logical functions of said Viterbi detector are implemented using at least 50% NMOS pass transistor logic; and in which said NMOS pass transistor Viterbi detector includes a plurality of critical paths which each include an input register, an output register, a three input adder and a multiplexer responsive to an input signal from said input register and to two other input signals for forwarding one of the three input signals to said three input adder to be combined with two other intermediate signals to produce an output signal to said output register.

4. A digital data signal processor for a PRML system comprising:

a gain control circuit responsive to a digital data signal for adjusting the gain of said data signal; wherein the logical functions of said gain control circuit are implemented using at least 50% NMOS pass transistor logic;

said gain control circuit including NMOS pass transistor arithmetic components including multipliers; and said multipliers each including a Booth encoder; a Wallace tree full adder array; an intermediate delay register; a Wallace tree half adder array; a parallel adder; and an output delay register.

5. A digital signal processor for a PRML system comprising:

a phase control circuit responsive to a digital data signal for adjusting the phase of said data signal; wherein the logical functions of said phase control circuit are implemented using at least 50% NMOS pass transistor logic;

said phase control circuit including NMOS pass transistor arithmetic components including multipliers; and said multipliers each including a Booth encoder; a Wallace tree full adder array; an intermediate delay register; a Wallace tree half adder array; a parallel adder; and an output delay register.

6. A digital data signal processor for a PRML system comprising:

an adaptive filter circuit responsive to a digital data signal for shaping said data signal into a PRML data signal; wherein the logical functions of said adaptive filter circuit are implemented using at least 50% NMOS pass transistor logic;

said adaptive filter circuit including NMOS pass transistor arithmetic components including multipliers; and said multipliers each including a Booth encoder; a Wallace tree full adder array; an intermediate delay register; a Wallace tree half adder array; a parallel adder; and an output delay register.

* * * * *